United States Patent [19]

Adahan

[11] Patent Number: 5,631,504

[45] Date of Patent: May 20, 1997

[54] AC/DC POWER SUPPLY

[76] Inventor: Carmeli Adahan, Netive Am 11, Ramot Gimmel, 97552 Jerusalem, Israel

[21] Appl. No.: 145,734

[22] Filed: Nov. 4, 1993

[51] Int. Cl.⁶ .................................................... H02J 4/00
[52] U.S. Cl. ................. 307/72; 307/26; 307/128; 363/21
[58] Field of Search ................ 307/72, 75, 80, 307/26, 128, 130; 323/901; 363/21

[56] References Cited

U.S. PATENT DOCUMENTS

| | | | |
|---|---|---|---|
| 4,185,315 | 1/1980 | Miller | 361/205 |
| 4,608,498 | 8/1986 | Falzarano et al. | 307/72 |
| 4,641,234 | 2/1987 | Bonal | 307/22 |
| 4,791,546 | 12/1988 | Carroll | 363/95 |
| 5,122,946 | 6/1992 | Taylor | 363/21 |
| 5,245,220 | 9/1993 | Lee | 307/80 |

*Primary Examiner*—William M. Shoop, Jr.
*Assistant Examiner*—Jonathan Kaplan
*Attorney, Agent, or Firm*—Benjamin J. Barish

[57] ABSTRACT

An AC/DC power supply includes an input sensing circuit for sensing whether the input connector is connected to an AC voltage source or to a relatively lower amplitude DC voltage source. When connected to the AC voltage source, a control circuit connects an input rectifier to the input circuit and also connects two primary windings of a power transformer in boosting relation to the output circuit. When the input connector is connected to the DC voltage source, the control circuit bypasses the input rectifier with respect to the input circuit, and connects only one of the primary windings to the output circuit while bypassing the other primary winding.

18 Claims, 1 Drawing Sheet

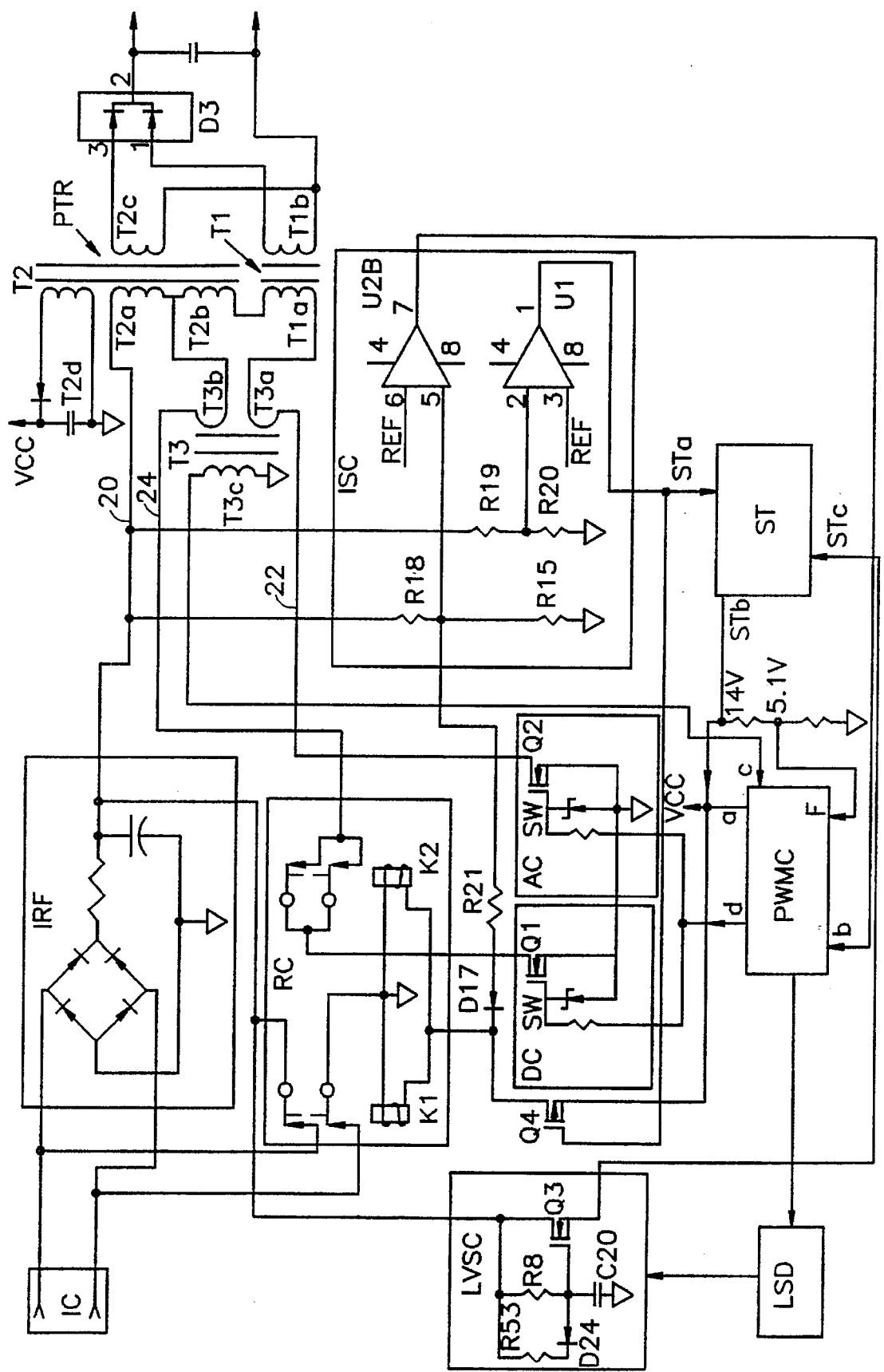

AC/DC POWER SUPPLY

FIELD AND BACKGROUND OF THE INVENTION

The present invention relates to electrical power supplies, and particularly to electrical power supplies which are essentially (but not exclusively) useful for certain medical devices, such as respirators, which may be connected either to an AC source or a DC source.

Power supplies for medical applications, such as respirators, require a very high degree of electrical safety. Such power supplies must frequently be capable of operating from an AC source such as AC household current, as well as from a DC source such as a standby battery or an automotive vehicle battery. Generally, the two power sources are isolated from each other, and/or special precautionary controls are provided, to prevent malfunction or exposing the user to a dangerous voltage if the two sources are plugged in at the same time. In addition, users are also generally required to preset the electrical device for an AC source or a DC source before turning-on the device. Failure to properly preset the electrical device, which can easily occur, may result in damage to the electrical appliance and/or a hazardous condition to the user.

OBJECTS AND BRIEF SUMMARY OF THE INVENTION

An object of the present invention is to provide a power supply which is connectible either to an AC source or to a DC source but which does not require the user to preset the device according to the source; such a device therefore reduces the possibility of an electrical hazard, and/or damage to the electrical device, by failure to take special precautions depending on whether the source is AC or DC. Another object of the invention is to provide a power supply which identifies the voltage present at its input and is automatically controlled in accordance with the input voltage, requiring no pre-setting or special precautions on the part of the user. A further object of the invention is to provide a power supply including a power transformer which is automatically connected according to different topologies, one for AC power sources, and the other for DC power sources.

According to one aspect of the present invention, there is provided an AC/DC power supply, comprising: an input connector for connection to a an AC voltage source or a DC voltage source; an input rectifier; an output circuit including a power transformer having at least two primary windings; a switching circuit outputting pulses to the primary windings of the power transformer; an input sensing circuit for sensing whether the input connector is connected to the AC voltage source or the DC voltage source; and a control circuit controlled by the input sensing circuit and effective, when the input connector is connected to the AC voltage source, to connect the input rectifier to the input circuit and also to connect both primary windings in boosting relation to the output circuit; and when the input connector is connected to the DC voltage source, to bypass the input rectifier with respect to the input circuit, and to connect only one of the primary windings to the output circuit while bypassing the other primary winding.

According to further features in the described preferred embodiment, the DC voltage source is of substantially lower amplitude than that of the AC voltage source; and the input sensing circuit senses the amplitude of the voltage source to determine whether it is an AC voltage source or a DC voltage source.

According to further features in the described embodiment, the switching circuit outputting pulses to the power transformer includes a duty-cycle control circuit for controlling the duty cycle of the pulses in response to the operation of the power transformer. In the described preferred embodiment, this duty-cycle control circuit includes a pulse-width modulator circuit operating in the current mode and receiving an input corresponding to the input current to the power transformer, further input corresponding to the output voltage of the power transformer.

Further features and advantages of the invention will be apparent from the description below.

BRIEF DESCRIPTION OF THE DRAWING

The invention is herein described, by way of example only, with reference to the accompanying single drawing FIGURE illustrating a preferred circuit constructed in accordance with the present invention.

DESCRIPTION OF THE PREFERRED EMBODIMENT

The power supply illustrated in the accompanying drawing includes a single input connector IC for connection to a source of either AC or DC voltage. For example, the illustrated system is capable of operating with DC of 11–35 volts or with AC of 90–265 volts, and produces a DC output voltage suitable for operating an electrical device such as a respirator.

The illustrated system includes an input rectifier and filter circuit, generally designated IRF, for rectifying the input if it is AC. When the input is DC, circuit IRF is bypassed, as will be described more particularly below.

The voltage input applied to the input connector IC is sensed by an input sensing circuit, generally designated ISC. Circuit ISC includes a first comparator U1 which compares the input voltage applied by a volt divider defined by resistors R19 and R20, with a reference voltage, and produces a positive output at its terminal "1" when the input voltage reaches 8 volts. This voltage is applied to energise a starter circuit ST. The input sensing circuit ISC includes a second comparator U2B which compares the input voltage, applied by a voltage divider defined by resistors R18 and R15, with a reference voltage, and produces a positive output voltage at terminal "7" to turn-on a pulse width modulator circuit generally designated PWMC. Circuit PWMC controls the duty cycle of a pair of switching transistors Q1, Q2 to a power transformer PTR for controlling the output of the power transformer. As will be described below, switching transistor Q1 is effective when the input is DC, and switching transistor Q2 is effective when the input is AC.

Circuit PWMC also controls a local shut-down circuit LSD to disconnect the starter circuit ST when the proper operating voltage has been reached. The latter control is effected via a low voltage sensor circuit LVSC, which includes a transistor Q3 effective to start the starter circuit ST only when there is sufficient voltage at the input connector IC.

Comparor U1 of the input sensing circuit ISC also controls a transistor Q4 which is energised, via terminal "1" of the comparator, when the input voltage is DC and reaches 8 volts. Energisation of transistor Q4 actuates two relays K1, K2 in a relay circuit RC. Relay K1 is effective to bypass the input rectifier and filter IRF, thereby preventing power loss (or voltage drop) when there is a DC input. Relay K2, when energised by transistor Q4 in the presence of a DC input, changes the connections to the power transformer PTR to minimise power loss, as will be described more particularly below.

Power transformer PTR includes three transformer sections T1, T2 and T3. Transformer section T1 includes a primary winding T1a and a secondary winding T1b; transformer section T2 includes two primary windings T2a, T2b and two secondary windings T2c. T2d; and transformer section T3 includes two primary windings T3a, T3b and a secondary winding T3c.

When the input is AC, switching transistor Q2 is effective as indicated earlier, so that the pulses generated by transistor Q2 are applied, via conductors 20 and 22, to primary windings T1a, T2a and T2b connected in a boosting relation. The arrangement is such that the two sections T1, T2 of the power transformer PTR operate in the "flyback mode". That is, when transistor Q2 is conducting, transformer sections T1 and T2 share the input voltage, and consequently transformer section T1 delivers instantaneous energy to the output circuit, while magnetic energy is stored in transformer section T2. When transistor Q2 is non-conducting, the stored magnetic energy in transformer section T2 flows to the output, while transformer section T1 discharges its parasitic energy also to the output.

When the input is DC, switching transistor Q1 is effective to supply the pulses to the power transformer PTR. In this case, the pulses are applied via the DC transistor switch Q1, the contacts of relay K2, and conductors 20, 24 only to primary winding T2a of transformer section T2; that is, primary winding T2b of transformer section T2, and also primary winding T1a of transformer section T1, are bypassed. The arrangement is such that when the input is DC, the power transformer PTR also operates according to the "flyback mode"; that is, when transistor Q1 is conducting, energy is stored in the core of transformer section T2; and as soon as transistor Q1 becomes non-conducting, this energy is transferred to the output circuit where it is connected to DC by an output rectifier OR.

It will thus be seen that when the input is AC, all the primary windings T1a, T2a, T2b are connected in a series boosting relation to maximise the coupling to the output circuit; whereas when the input is DC, only primary winding T2a is effective to receive the primary current, thereby minimising the voltage drop in the power transformer. This feature is very significant where the input is a battery of low DC voltage, since it minimizes the voltage drop across the power transformer and conserves the battery life.

The third section T3 functions to provide feedback pulses to the pulse width modulator circuit PWMC to control the duty cycle of transistors Q1 and Q2 in response to the operation of the power transformer. Thus, primary winding T3a of transformer section T3 is in series with conductors 20 and 22 effective when the input is AC, and its primary winding T3b is in series with conductors 20 and 24 effective when the input is DC.

Secondary winding T3c of transformer section T3 generates a voltage in response to the current through either of its primary windings T3a or T3b and applies same to input terminal "a" of the pulse width modulation control circuit PWMC to control the duty cycles of transistors Q1, Q2. In addition, transformer section T2, which is effective when the input is either DC or AC as described above, generates an output voltage via its winding T2d which is applied to the voltage supply terminal "a" of circuit PWMC receiving the volts supply $V_{cc}$.

The system illustrated in the drawing operates as follows:

When the input connector IC is connected to a source of DC voltage, this voltage is immediately sensed by comparator U1 of the input sensing circuit ISC; and when this input voltage reaches 8 volts, it produces an output signal from its terminal "1" to terminal STa of the starter circuit ST, which provides power via its terminal STb to terminal $V_{cc}$ connected to input terminal "a" of the pulse width modulator circuit PWMC. However, circuit PWMC remains shut down until such time as the input voltage reaches 11 volts, as sensed by comparator U2B of the input sensing circuit ISC, which produces an output via its terminal "7" to terminal "b" of circuit PWMC. At this time, (i.e., when the input voltage reaches 11 volts) circuit PWMC becomes operative.

As soon as circuit PWMC becomes operative, it sends a signal to the local shut-down circuit LSD. The latter circuit controls transistor Q3 in the low voltage sensor circuit LVSC, turning-off the transistor. This produces a signal to terminal STc in the starter circuit ST turning-off the starter circuit. Accordingly, as soon as circuit PWMC becomes operative, starter circuit ST is turned off. At this time, power is applied to circuit PWMC via transistor Q4, which is turned on by the 8 volt output pulse from terminal "1" of comparator U1 in the input sensing circuit ISC.

Energisation of transistor Q4 actuates the two relays K1 and K2. Actuation of relay K1 causes the input rectifier and filter circuit IRF to be bypassed, thereby minimising the voltage drop and loss of energy through this rectifier when the input is DC. Energisation of relay K2 connects the DC transistor switch Q1 to the power transformer PTR via conductors 24 and 20. As described earlier, the power transformer operates in the "flyback mode" in which conductors 20 and 24 connect only transformer winding T2a to the DC transistor switch Q1 so that the pulses produced by that switch pass only through transistor winding T2a, and not through transistor windings T2b or T1a. This connection of the power transformer during DC operation thereby also reduces the voltage drop and the energy loss.

During the DC operation, the pulse width modulator circuit PWMC controls the duty cycle of the DC switching transistor Q1 in response to the operation of the power transformer PTR. Thus, the current passing through the primary winding T2a of the power transformer is sensed by primary winding T3b of transformer section T3, to produce an output voltage in secondary winding T3c corresponding to the current; this voltage is applied to terminal "c" of circuit PWMC. In addition, the output voltage from the power transformer PTR is sensed by secondary winding T2d, which applies a voltage corresponding to the output voltage to the power supply terminal $V_{cc}$ of circuit PWMC.

The pulse width modulator circuit PWMC may be a commercially-available circuit, such as the Unitrode UC3823. The input voltage applied via its terminal "a" is referenced to an internal reference and produces an error signal which is amplified and compared to the input current signal applied via its terminal "c", to produce an output signal from its terminal "d" which is applied to the DC switching transistor Q1 to control the width of the pulses outputted by the DC switching transistor Q1. As one example, PWMC circuit could operate at about 250 KHz.

When the input connector IC is connected to an AC source, e.g. 90–265 volts, as soon as the output of comparator U1 reaches 35 volts its output terminal "1" will go negative to ground. This turns-off transistor Q4, which deenergises the two relays K1, K2. Deenergisation of relay K1 interrupts the bypass circuit of input rectifier and filter circuit IRF, thereby introducing that circuit into the input line; and deenergisation of relay K2 connects the primary windings T1a, T2a and T2b of the power transformer PTR in a series boosting relation between conductors 20, 22 in series with the AC switching transistor Q2. When this input is AC, the power transformer also operates according to the "flyback mode" as described above.

When relay K2 is deenergised, diode D17 becomes conducting, since it is biased to ground, thereby conducting current through resistor R21 which reduces the voltage at terminal "5" of comparator U2B. This terminal is a non-verting input terminal of the comparator, so that terminal "7" of comparator U2B goes negative. This causes the pulse width modulator control circuit PWMC to shut down, until the voltage at the input connector IC rises to a predetermined level, wherein the non-inverting input terminal "5" equals the reference voltage at terminal "6" at the inverting input. When this occurs, the output terminal "7" of comparator U2B goes positive, turning on circuit PWMC.

While the power supply is operable, the local shut down circuit LSD renders transistor Q3 non-conductive, thereby keeping the starter circuit ST inoperative for lack of power.

The pulse width modulator control PWMC operates in the same manner as described above, except in this case it controls the duty cycle to the AC transistor switch Q2. This control is in accordance with the input current to the power transformer, as sensed by primary winding T3a of transformer section T3, and the output voltage from the power transformer as sensed by secondary winding T2d of transformer section T2. As described above, the primary windings T1a, T2a and T2b of the power transformer PTR are connected in a series boosting relation between conductors 20 and 22 with the AC switch Q2 to maximise the coupling to the output rectifier OR in the output circuit.

The illustrated circuit prevents the power supply from operating with insufficient AC input voltage, but still allows a DC input to activate it. This function is controlled by transistor switch Q3 in the low voltage sensor circuit LVSC. The latter circuit includes a capacitor C20 which is charged via resistor R8 to drive transistor Q3. When insufficient AC voltage is applied, the voltage fluctuations across capacitor C20 keep discharging it before it obtains sufficient voltage to turn-on transistor Q3. The discharge path of capacitor C20 is through resistor R53 and diode D24. Thus, only sufficient AC voltage at the inlet connector IC, or a DC voltage at the inlet connector, will charge capacitor C20 to a level sufficient to turn-on transistor Q3, and thereby to enable the starter circuit ST.

While the invention has been described with respect to one preferred embodiment, it will be appreciated that this is set forth merely for purposes of example, and that many other variations, modifications and applications of the invention may be made.

What is claimed is:

1. An AC/DC power supply, comprising:
an input connector for connection to an AC voltage source or a DC voltage source;
an input rectifier;
an output circuit including a power transformer having at least two primary windings;
a switching circuit outputting pulses to the primary windings of the power transformer;
an input sensing circuit for sensing whether said input connector is connected to said AC voltage source or said DC voltage source;
and a control circuit controlled by said input sensing circuit and effective, when said input connector is connected to said AC voltage source, to connect said input rectifier to said input connector and also to connect both primary windings in boosting relation to the output circuit; and when said input connector is connected to said DC voltage source, to bypass said input rectifier with respect to said input circuit, and to connect only one of said primary windings to the output circuit while bypassing another primary winding, such that coupling to the output circuit is maximized when aid input connector is connected to an AC voltage source, and the Voltage drop in the power transformer is minimized when the input connector is connected to DC voltage source.

2. The power supply according to claim 1, wherein said DC voltage source is of a substantially lower amplitude than that of said AC voltage source; and wherein said input sensing circuit senses the amplitude of the voltage source to determine whether it is an AC voltage source of a DC voltage source.

3. The power supply according to claim 1, wherein said control circuit includes:
a first relay which is actuated when the input connector is connected to a DC voltage source to bypass said input rectifier with respect to said output circuit;
and a second relay which is actuated when the input connector is connected to a DC voltage source to control the power transformer to bypass one of said primary windings with respect to said output circuit.

4. The power supply according to claim 1, wherein the power transformer is connected according to a flyback mode of operation including said at least two primary windings in boosting relation when the input is AC and in a flyback mode of operation including only one of said primary windings when the input voltage source is DC.

5. The power supply according to claim 1, wherein said switching circuit outputting pulses to the power transformer includes a duty-cycle control circuit for controlling the duty cycle of said pulses in response to the operation of the power transformer.

6. The power supply according to claim 5, wherein said duty-cycle control circuit for controlling the duty cycle of the pulses to the power transformer includes a pulse-width modulator circuit operating in the current mode and receiving an input corresponding to the input current to the power transformer.

7. The power supply according to claim 6, wherein said pulse-width modulator circuit includes a further input corresponding to the output voltage of the power transformer and controls the duty cycle in response thereto.

8. The power supply according to claim 6, further including:
a starter circuit for supplying power to the switching circuit;
said input sensing circuit sensing the input voltage and effective when the input voltage reaches a first predetermined magnitude to supply power to the starter circuit, and when it reaches a second predetermined magnitude to supply power to the pulse-width modulator circuit and to disconnect the power to the starter circuit.

9. The power supply according to claim 8, wherein said input sensing circuit includes:
a first comparator which receives the input voltage, compares it with a first reference corresponding to said first predetermined voltage, and produces an output to said starter circuit;

and a second comparator which receives the input voltage, compares it with a second reference corresponding to said second predetermined voltage, and produces an output to said pulse width modulator circuit;

said power supply further including a local shut-down circuit controlled by said pulse width modulator circuit, upon being energised by the output of said second comparator, to deenergise said starter circuit.

10. The power according to claim 9, wherein said control circuit includes:

a relay which, when actuated, bypasses said input rectifier with respect to said output circuit;

and a transistor for deactuating said relay when one of said comparators of the input sensing circuit senses an input above a third predetermined voltage.

11. The power supply according to claim 10, wherein said predetermined voltage is about 8 volts, said second predetermined voltage is about 11 volts, and said third predetermined voltage is about 35 volts.

12. The power supply according to claim 8, further including a low AC voltage sensor circuit effect, when the AC input voltage is below a predetermined minimum, to prevent energisation of the starter system.

13. The power supply according to claim 12, wherein said low voltage sensing circuit includes a capacitor which is charged by the AC input, and a transistor controlled by the charge on said capacitor and effective to deenergise the starter circuit when the charge on the capacitor is insufficient to energise said transistor.

14. An AC/DC power supply connectable to an AC input voltage source or to a DC input voltage source of amplitude substantially lower than that of the AC input voltage source, comprising:

a rectifier for rectifying the input when the input is AC;

a power transformer including at least two primary windings;

a switching circuit outputting pulses to the power transformer when the input is either AC or DC;

an input sensing circuit for sensing the amplitude of the input voltage and for determining thereby whether the input is AC or DC;

and a control circuit controlled by said input sensing circuit for controlling the power transformer to connect the two primary windings in boosting relation with respect to the output circuit when the input is AC, and to bypass one of the primary windings and the rectifier with respect to the output circuit when the input is DC.

15. The power supply according to claim 14 wherein said control circuit includes:

a first relay which is actuated when the input is DC to bypass said rectifier with respect to said output circuit;

and a second relay which is actuated when the input is DC source to to bypass one of the primary windings and the rectifier with respect to the output circuit.

16. The power supply according to claim 15, wherein the power transformer is connected according to a flyback mode of operation including said at least two primary windings in boosting relation when the input is AC and in a flyback mode of operation including only one of said primary windings when the input is DC.

17. The power supply according to claim 16, wherein said switching circuit outputting pulses to the power transformer includes a duty-cycle control circuit for controlling the duty cycle of said pulses in response to the operation of the power transformer.

18. The power supply according to claim 17, wherein said duty-cycle control circuit for controlling the duty cycle of the pulses to the power transformer includes a pulse-width modulator circuit operating in the current mode and receiving a first input corresponding to the input current to the power transformer, and a second input corresponding to the output voltage of the power transformer.

* * * * *